Figure 1:
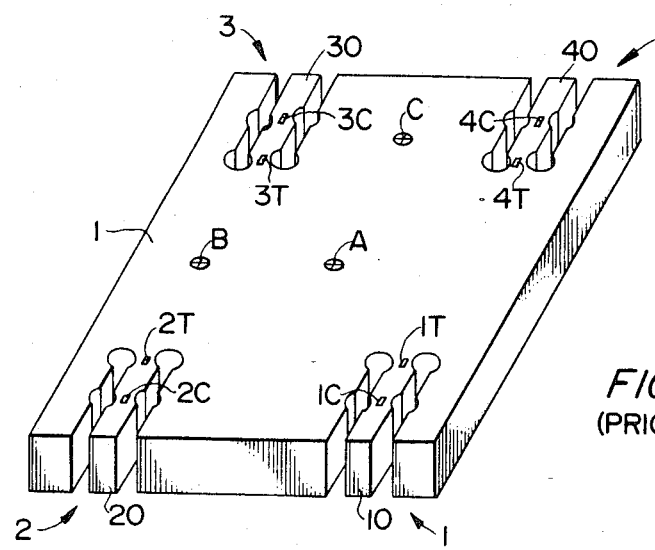

United States Patent [19]

Lockery et al.

[11] Patent Number: 4,556,115
[45] Date of Patent: Dec. 3, 1985

[54] METHOD AND MEANS FOR EQUALIZING THE MEASURING SENSITIVITY OF A PLURALITY OF STRAIN GAGE TRANSDUCERS

[75] Inventors: Harry E. Lockery, Sudbury; Edward Freymiller, Lynnfield, both of Mass.

[73] Assignee: Hottinger Baldwin Measurement, Inc., Framingham, Mass.

[21] Appl. No.: 505,395

[22] Filed: Jun. 17, 1983

[51] Int. Cl.$^4$ .................. G01G 3/14; G01G 19/52; G01L 1/22; G01L 25/00

[52] U.S. Cl. .................. 177/211; 177/50; 73/862.67; 73/1 B

[58] Field of Search .................. 177/50, 1, 211; 73/862.67, 1 B

[56] References Cited

U.S. PATENT DOCUMENTS

| | | | |
|---|---|---|---|
| 4,331,035 | 5/1982 | Eisele et al. | 73/862.67 X |
| 4,380,175 | 4/1983 | Griffen | 177/211 X |
| 4,453,609 | 6/1984 | Griffen et al. | 177/211 |

Primary Examiner—George H. Miller, Jr.
Attorney, Agent, or Firm—W. G. Fasse; D. H. Kane, Jr.

[57] ABSTRACT

The load measuring sensitivities of transducers, such as beam type transducers, or the like, are desensitized by connecting a desensitizing resistance in series with the strain gages attached to a transducer so that these desensitizing resistances become part of the respective bridge arm in which the corresponding strain gage is located. In a group of four transducers, each carrying, for example two strain gages, the transducer which has the lowest sensitivity is ascertained. Thereafter, the sensitivities of the other three transducers are reduced by the desensitizing resistors connected directly in series with the strain gages in the other three transducers so that all have substantially the same sensitivity as the mentioned lowest initial sensitivity in the group of transducers. Any influences of these desensitizing resistors from one bridge arm to another bridge arm are considered in the derivation of the correct desensitizing resistances. Thereafter, a further sensitivity equalization may be achieved by mechanically increasing the sensitivity of those transducers in the group still having a lower sensitivity than the lowest sensitivity transducer in the group. Such mechanical sensitivity increase involves removing material from the sensing portion of a transducer for example by filing or grinding until all transducers of a group have the same sensitivity within an acceptable tolerance range, for example, 0.02%.

2 Claims, 4 Drawing Figures

METHOD AND MEANS FOR EQUALIZING THE MEASURING SENSITIVITY OF A PLURALITY OF STRAIN GAGE TRANSDUCERS

CROSS-REFERENCE TO RELATED PATENTS AND APPLICATIONS

The present disclosure is related to U.S. Pat. No. 4,261,429, issued Apr. 14, 1981, for "UNITIZED WEIGHING APPARATUS AND METHOD FOR MAKING SUCH AN APPARATUS"; and to U.S. patent application Ser. No. 263,505, filed on May 14, 1981, now U.S. Pat. No. 4,411,327, granted on Oct. 25, 1983, for "APPARATUS FOR APPLYING A LOAD TO A STRAIN GAGE TRANSDUCER BEAM".

BACKGROUND OF THE INVENTION

The present invention relates to a method and means for equalizing the measuring sensitivity of a plurality of strain gages connected in transducer bridge circuits for example for achieving uniform weight readings regardless of the position of a load on the platform of a scale. Specifically, the invention provides a new method and apparatus for equalizing the sensitivity of a plurality of beam type force transducers associated with platform scale transducers. The invention is particularly applicable to scales and devices for measuring mass or force in which the signal outputs are derived from strain gages forming part of force sensitive transducers located, for example, in a scale at the corners of the scale structure. The present method is advantageously applied to the gaged plate transducers and platform type scales described in the cross-referenced patent and patent applications.

U.S. Pat. No. 4,261,429 discloses a platform scale in which strain gage transducer beam elements are formed as integral components of the platform. The transducer beams have a flexural free end and a fixed end merging into the platform structure. For this purpose, slots are milled, machined, or cut into the platform so that two parallel slots define the beam structure. A cross slot may define the free end. The sensitivity of the beam is initially established by drilling holes through the platform at the fixed end of each slot and intermediate the ends of each slot. A plurality of transducer beams, typically four, are situated in the corners of the platform and the force associated with an applied mass or load may be applied to the transducer beams in various ways, for example by ball and socket loading means.

Strain gages are secured, for example, by adhesive bonding to the transducer beams. All the strain gages are electrically interconnected to form bridge circuits which in turn provide a combined signal output from the platform scale directly related to the sum or average of the forces measured by the respective strain gages and transducer beams. Structures employing beam type transducers constructed as an integral part of a platform are referred to herein as "gaged plate transducers" or simply as "gaged plates".

Such gaged plate transducers are incorporated in platform scales of U.S. Pat. No. 4,411,327 referred to above. Two parallel horizontal platforms are coupled together in the weighing apparatus. A load is placed on the upper horizontal platform. The strain gage transducer beams are integrally formed in the lower horizontal platform which constitutes a gaged plate transducer. Force transmitting bars or brackets in each corner transfer a vertical load from the upper platform to the respective flexural strain gage transducer beam structures in the lower platform through a variety of couplings. These couplings transfer vertical load components to the strain gage transducer beams while substantially reducing or preventing the introduction of transverse or lateral load components. According to one embodiment, a "ball and socket" type loading is used for substantially preventing the transmission of horizontal force components while at the same time transmitting vertical force components from the upper platform into the lower gaged plate transducer platform.

In the example of the gaged plate transducers it is practical to provide each of the four transducer beams with two strain gages secured as mentioned above. The eight strain gages are interconnected in two parallel bridge circuits providing a sum or average of the loads or strains measured by all the strain gages. It is desired that the combined signal output remains constant or uniform for any particular load regardless of the position of the load on the platform. To achieve such uniform output signal independently of any load position the sensitivities of the respective transducer beams must be equalized. In U.S. Pat. No. 4,261,429 the sensitivities of the respective strain gage transducer beams are made equal by mechanically adjusting or reducing the cross-sectional dimensions of a portion or portions of the transducer beam where the strain gages are secured. The thickness or width of the beams where the strain gages are located is reduced by filing or grinding until the sensitivities at all corners or rather of all transducer beams are equal within an acceptable tolerance range.

The procedure for achieving such uniform sensitivity by mechanical adjustments is as follows. The load is applied successively to each corner or other load sensitive transducer location of the gaged plate transducer. The scale output is measured at each successive position to determine the relative sensitivity of each transducer beam to the applied load. The outputs at the least sensitive locations are increased by filing or grinding thereby reducing the width or thickness of the transducer beam in the area where the strain gages are located. These steps may be repeated until the sensitivities of the respective transducer beams are equalized. Highly accurate gaged plate transducers and platform scales yielding load measurements which are quite independent of the position of the load may be provided by this method. However, the method has been found to be time consuming for a number of reasons.

Substantial grinding or filing causes heating of the transducer beams and therefore the temperature of the strain gages located near the area where mechanical material removal occurs is also raised. This is not desirable because the individual strain gages are temperature sensitive and conventional temperature compensation methods do not operate effectively because these localized elevated temperatures are not sensed by the remotely located temperature compensation components and errors may occur when attempting adjustment of output or sensitivity in each corner. It is therefore necessary for the operator carrying out the mechanical sensitivity equalization to allow the temperature of each beam to return to its ambient level before further load measurements and subsequent adjustments may be made. A considerable number of repeated and gradual adjustments are normally required for equalization of sensitivity in all scale corners. The total time required for the mechanical method of sensitivity adjustment may therefore be quite long because of the required temperature stabilization periods.

Adjustment of gaged plate sensitivity in each corner by filing or grinding of the transducer beams is a laborious and time consuming task, for other reasons as well. To perform the filing the gaged plate is normally turned upside down and relatively large amounts of material may have to be removed from the flexural sensing portion of the transducer beam. The platform scale is then returned to its normal position and reassembled to the loading fixtures for further measurements with a load applied to different locations on the platform. The process may have to be repeated several times to equalize the sensitivity in each corner of a scale to within a small specified tolerance limit of, for example, 0.02%. The procedure may require up to two or three hours for a satisfactory equalization of sensitivities.

A further complication may attend the mechanical method of equalization of sensitivities when applied to the gaged plate transducers of the cross-references. Generally two strain gages are secured to each transducer beam at two sensing positions. The location of the strain gages and the manner in which they are electrically interconnected renders the beams and associated strain gages relatively insensitive to position of the load introduction to the beam. If equal amounts of material are not removed from the two sensing positions of the beam, the beam may become more sensitive to the point of load application on the transducer beam. Under normal conditions of equal cross-sectional width and thickness of the beam at the two strain gage locations, the sensitivity of the transducer beam is substantially the same regardless of the point of load application. But during the material removal at each strain gage location, it is difficult to maintain the two cross-sections the same. As a result, the sensitivity to load introducing position increases. Even though the ball and socket load introduction technique minimizes changes in load introduction positions there is unavoidably some change in load introduction positions under repeated loadings. As the beams become more sensitive to load introduction positions resulting from differing beam cross-sections, repeatability errors develop because of the small changes in load introduction positions encountered even with the ball and socket load introduction means.

OBJECTS OF THE INVENTION

In view of the above it is the aim of the invention to achieve the following objects singly or in combination:
  to provide a non-mechanical method for equalizing the sensitivities of a plurality of load sensitive transducers incorporated in a mass or force measuring device in order to achieve a uniform load measurement independent of the load position;
  to provide a rapid and inexpensive method for equalizing the sensitivities of the individual load sensitive transducers of a load measuring device;
  to provide an electrical method for equalizing the sensitivities of a plurality of load sensitive transducers of a group by ascertaining the transducer having the lowest sensitivity in the group and desensitizing the other transducers so that they also have the same lower sensitivity;
  to desensitize load sensitive transducers by interposing selected desensitizing resistances in series with the respective strain gages of the transducer;
  to provide a temperature independent method for correcting and equalizing the transducer sensitivities so as to make a measuring device substantially independent of the location of the load on the structure; and
  to provide a hybrid method for calibrating and equalizing the sensitivities of load sensitive transducers by electrically desensitizing transducer elements of greater sensitivity down to a substantially common lowest sensitivity and then mechanically sensitizing the transducers of the group up to the sensitivity which is still the highest after the electrical desensitizing.

SUMMARY OF THE INVENTION

In order to accomplish these results the invention provides a method for equalizing the sensitivities of a plurality of load sensitive transducers in or on a load measuring device. In the method of the invention a load is first applied successively to each of the beam transducers associated with the load measuring device and the output of the load measuring device is ascertained for each of the successive locations of the load. The load sensitive transducer having the lowest signal output is identified and used as a reference to which the other transducers will be desensitized. The method provides for electrically desensitizing the strain gages of the transducers having a load measurement sensitivity greater than the reference sensitivity. Such desensitizing is accomplished by inserting desensitizing resistances in series with the strain gages of the respective load sensitive transducer. The resistance values of the desensitizing resistances are selected for substantially equalizing the load measurement sensitivity of each of the transducers to the reference sensitivity.

According to one preferred embodiment but applicable to many others, the weighing apparatus comprises at least four load sensitive transducers each having at least two strain gages. The two strain gages of each transducer are electrically connected together in a half bridge circuit. The respective half bridge circuits corresponding to the four transducers are electrically connected together to form first and second transducer full bridge circuits. The first and second full bridge circuits are connected in parallel for providing two common power input bridge terminals and two common signal output bridge terminals. The desensitizing resistors are connected in series with the strain gages in each half bridge circuit. First, the sensitivities of two paralleled half bridges of the first and second transducer bridge circuits are equalized by inserting a desensitizing resistance directly in one of the paralleled half bridges. Then the sensitivities of the other two paralleled half bridges of the first and second transducer bridge circuits are equalized by inserting a second desensitizing resistance directly in one of the other paralleled half bridges. Next, the sensitivites of the two pairs of paralleled half bridges are made equal to each other by inserting a third desensitizing resistance directly in both half bridges of the pair of paralleled half bridges having, collectively, the greater sensitivity.

The specific desensitizing resistances may take numerous forms. As they are generally low in numerical value (0 to 10 ohms) they may consist simply of short, small diameter wire with low temperature coefficient of resistance, the latter to ensure that temperature errors are not introduced by the desensitization technique. Or well known ladder networks can be employed wherein a network of binary weighted resistances are provided, shorted out by low resistance shunting paths. Removing certain shunts brings into circuit certain of the binary weighted resistances, achieving thereby, the necessary desensitization. Alternatively, abradable printed circuit resistors may be used in which the desired desensitizing resistances can be established by abrading the resistance elements. And, of course, potentiometers and other variable or adjustable resistances can be employed. The specific method used to provide the correct desensitizing resistance depends upon the application itself. But it is the matter of strain gage desensitization, its calculation and use in establishing load position independence in multi-transducer mass and force measuring systems which is of primary concern in this invention.

A hybrid method and apparatus according to the invention involves the combination of the above desensitization with a final equalization of sensitivities by a mechanical sensitizing method as described above. According to the hybrid method of the present invention, the sensitivities of the respective load sensitive transducers are first brought to within a tolerance limit of approximately 0.1% using the electrical desensitization method. In the final step of equalization the transducers are mechanically sensitized, for example by grinding or filing to bring the respective sensitivities to within a tolerance limit of about 0.02%.

BRIEF FIGURE DESCRIPTION

Figure 2:
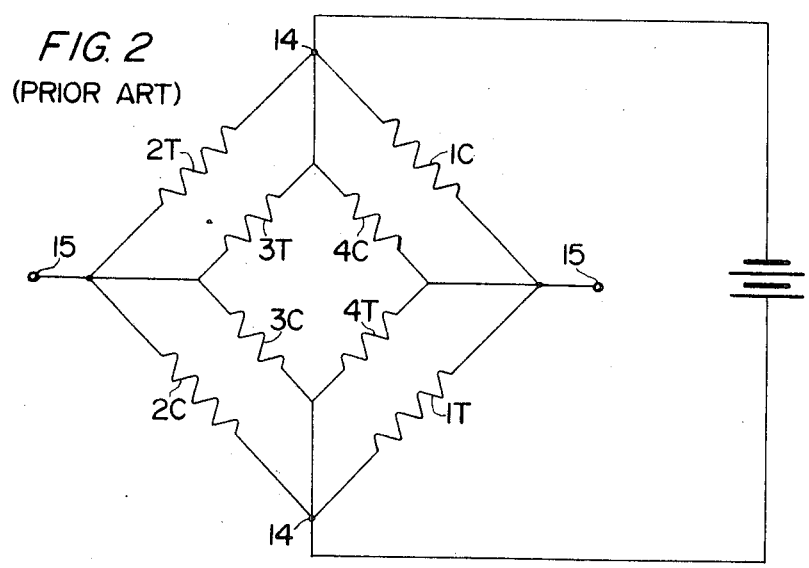
Figure 3:
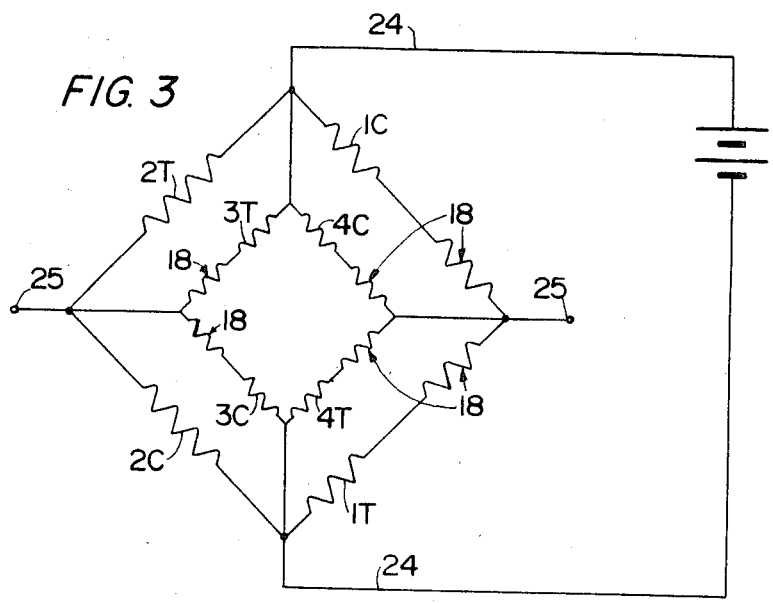
Figure 4:
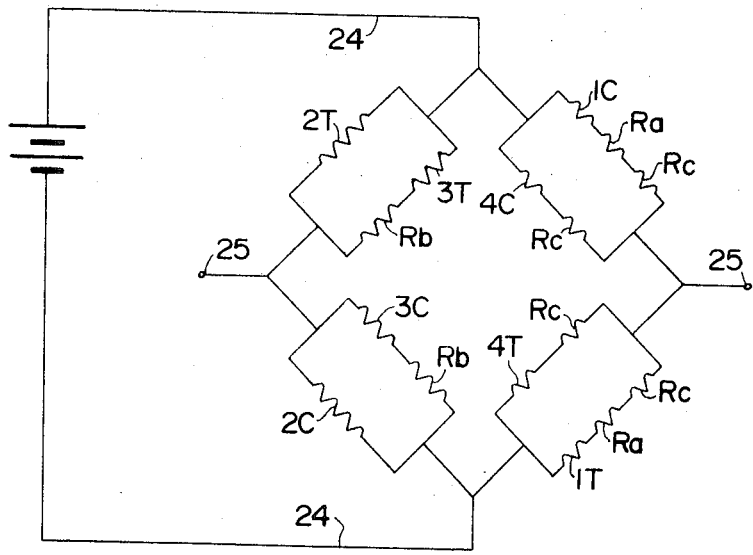

In order that the invention may be clearly understood, it will now be described, by way of example, with reference to the accompanying drawings, wherein:

FIG. 1 is a perspective view of a prior art gaged plate transducer platform or gaged plate as described in U.S. Pat. No. 4,261,429;

FIG. 2 is a schematic circuit diagram of the first and second bridge circuits connected in parallel for interconnecting the strain gages of the gaged plate according to the disclosure of U.S. Pat. No. 4,261,429;

FIG. 3 is a schematic circuit diagram of another set of first and second bridge circuits connected in parallel for interconnecting the strain gages of four transducers having strain gages connected in series with desensitizing resistors in accordance with the present invention; and FIG. 4 is another bridge circuit including paralleled connected half bridges according to a further embodiment of the present invention.

DETAILED DESCRIPTION OF PREFERRED EXAMPLE EMBODIMENTS AND OF THE BEST MODE OF THE INVENTION

A gaged plate transducer or gaged plate of the type described in U.S. Pat. No. 4,261,429 is illustrated in FIG. 1. The gaged plate is formed with four load sensitive transducer locations 1, 2, 3, 4 at each corner of the platform. A single beam type transducer 10, 20, 30, 40 is located at each corner. The load is transferred to the beam type transducers by a variety of mechanical arrangements not part of this invention, but described in U.S. Pat. No. 4,261,429 and U.S. Pat. No. 4,411,327. Two strain gages T and C are applied on each of the beam type transducers, whereby "T" designates tension sensing at the inner or root end of a transducer and "C" designates compression sensing near the free end of a transducer. Each strain gage designation is preceded by the respective location number. Thus, the strain gages at location 1 are designated 1T and 1C.

The strain gages are electrically interconnected in first and second paralleled bridge circuits in the manner shown in FIG. 2. Each strain gage is indicated by a resistor symbol with its strain gage designation. The parallel connection of the two transducer bridge circuits has common power supply terminals 14 and common signal output terminals 15. The signal output from the two bridges is proportional to the sum or average of the strain signals from the respective strain gages and is therefore proportional to the load or weight applied to the load measuring device. If the sensitivity of each of the transducers differs from the sensitivity of any other transducer of a group of transducers, then the measured output signal will vary according to the position of the load on the platform, for example, when the load is effective at any one of the locations A, B, or C. According to the conventional method, the sensitivity of each transducer having a lower sensitivity than that of a transducer having the highest sensitivity in a group of transducers is increased by modifying the cross-section of the respective transducers 10, 20, 30 and 40 by mechanical means such as filing or grinding.

According to the present invention equalization is primarily accomplished by electrical desensitization of the strain gages of the transducers which have a higher sensitivity than the transducer with the lowest sensitivity. Thus, while the prior art tries to duplicate the highest transducer sensitivity in the others by mechanical means, the invention in its first approach reduces the sensitivity through electrical means by inserting appropriate desensitization resistances directly in series with the strain gages on each transducer.

The change in resistance of a strain gage is directly related to the applied strain as set forth in Equation (1) in which GF is the gage factor, $\Delta R/R$ is the unit change in resistance, and $\Delta l/l$ represents the unit change of length or strain being sensed.

$$GF = \frac{\Delta R/R}{\Delta l/l} \qquad \text{Equation (1)}$$

Solving this equation for $\Delta R/R$, Equation (2) indicates that the unit change in strain gage resistance is directly proportional to the gage factor and the strain being sensed.

$$\Delta R/R = (GF)\Delta l/l \qquad \text{Equation (2)}$$

According to the invention the sensitivities to an equal load applied sequentially to each transducer at each location are substantially equalized by desensitizing the strain gages of transducers with the greater sensitivity. This desensitization is achieved by connecting a small resistance directly in series with the active strain gages. These desensitizing resistances do not sense any strain and are insensitive to temperature changes. By this expedient the denominator R of the unit change in resistance in $\Delta R/R$ is increased, while the absolute change in resistance $\Delta R$ remains the same.

Thus, while the numerator $\Delta R$ remains the same, the increase in the denominator results in a smaller unit change in resistance for the same strain. It is in this sense that a strain gage is "desensitized". If a desensitizing resistance $R_D$ is inserted in series with the strain gage, then the new unit change in resistance called $\Delta R/R$ effective or $\Delta R/R_{eff}$ is related to $\Delta R/R$ by a factor of $1+R_D/R$ in the denominator as follows:

$$\frac{\Delta R}{R_{eff}} = \frac{\Delta R/R}{1 + R_D/R} \quad \text{Equation (3)}$$

For example, if $R_D$ is made equal to 1% of R then $\Delta R/R_{eff}$ is reduced and lower than the original $\Delta R/R$ by 1%. In this manner, according to the invention, the individual strain gages can be desensitized to any desired amount by adding the appropriate desensitizing resistance, $R_D$.

The load sensitive transducer at the corner having the lowest sensitivity to the applied load is the reference transducer. Appropriate desensitizing resistances are then added in series with the strain gages at the other three locations to bring their sensitivities down to that of the transducer at the reference location.

The addition of desensitizing resistances is shown in the two parallel connected transducer bridge circuits of FIG. 3, wherein the desensitizing resistances 18 of differing selected resistance values are connected in series with each of the respective strain gages. The two strain gages at each load sensitive location mounted on a transducer are electrically connected to form a half bridge. Thus, the strain gages 1C and 1T at the first location 10 form half bridge (1) while the strain gages 2C and 2T at the second location 20 form half bridge (2). The half bridges (1) and (2) are combined to form the first transducer bridge circuit. The strain gages 3C and 3T at the third location 30 form half bridge (3) while the strain gages 4C and 4T at the fourth location 40 form half bridge (4). The half bridges (3) and (4) form the second transducer bridge circuit. The first and second transducer bridge circuits form a parallel double bridge circuit with common power supply terminals 24 and common signal output terminals 25. The half bridges (1) and (4) corresponding to locations 1 and 4, constitute one pair of parallel half bridges while the half bridges (2) and (3) corresponding to locations 2 and 3 constitute the second pair of parallel half bridges.

According to the strategy of the present invention for equalization of sensitivities, the sensitivities of half bridges (1) and (4) are first equalized with respect to each other by inserting appropriate resistances 18 in series with the respective strain gages of one of the half bridges, the one with the higher sensitivity. The sensitivities of half bridges (2) and (3) corresponding to locations 2 and 3 are equalized by similarly adding further desensitizing resistances 18. In each instance this is accomplished by moving the same load or weight on the gaged plate platform scale to different transducer positions corresponding to their respective locations and determining the respective sensitivities of each transducer, and the required resistance value of the desensitizing resistances. At this point the sensitivities of transducers 1 and 4 have been made equivalent. Those of transducers 2 and 3 have been made equivalent as well. But the collective sensitivity of paralleled half bridges (1) and (4) will not normally be equal that of paralleled half bridges (2) and (3). The collective sensitivity of the first pair of half bridges corresponding to locations 1 and 4 must be equalized with the second pair of half bridges corresponding to locations 2 and 3. This requires further variation of the values of the respective desensitizing resistances 18 which will be described below.

Calculation of the required desensitization resistances is not a straight forward operation because of the parallel combination of the bridge circuits and the parallel configuration of the half bridge pairs which causes an interaction between half bridges when desensitizing. That is, if desensitization resistances are added to the first half bridge corresponding to location 1, for instance, to reduce the sensitivity of the half bridge (1) for equalization to the sensitivity of the half bridge (4), the sensitivity of the half bridge (4) corresponding to location 4 increases because it is being shunted by a higher impedance by virtue of the desensitization resistance added to the first half bridge. Therefore, in calculating the selected value for the desensitization resistance, which must be added to a given half bridge, the effect on the other half bridge of the paralleled pair must be taken into account. A feature and advantage of the invention is that there is a unique solution to the problem of equalization of sensitivities which takes into account the mutual effect and interaction between the paralleled half bridges of a pair of half bridges, as will now be explained.

When a desensitizing resistor $R_D$ is added to just one half bridge, for example the first half bridge corresponding to location 1, the output for the strain gage pair 1C and 1T is modified as set forth in Equation (4) where R is the resistance of a strain gage under no external strain and $\Delta$ is the resistance change in the strain gage due to the applied load.

$$\frac{\text{Output } (1C + 1T) \text{ without } R_D}{\text{Output } (1C + 1T) \text{ with } R_D} = \frac{(R + R_D)(2R + R_D + \Delta)}{(R)(2R + \Delta)} \quad \text{Equation (4)}$$

For example, in one gaged plate structure according to the invention, each of the strain gages have an initial resistance R of 350 ohms when no load is applied. A typical change $\Delta$ in the strain gage resistance due to an applied load would be in the order of $\Delta = 0.35$ ohms. For these selected parameters and for the range of differences in sensitivities between locations commonly encountered, the exact solution of Equation (4) can be simplified by the approximations set forth in the following Equation (5).

$$R_D \simeq 232 \left( \frac{\text{Output } (1C + 1T) \text{ without } R_D}{\text{Output } (1C + 1T) \text{ with } R_D} \right) - 1 \quad \text{Equation (5)}$$

When a desensitizing resistor is added to half bridge (1) corresponding to location 1, the output sensitivity of half bridge (4) forming a paralleled half bridge pair with half bridge (1) is increased due to the increase in shunting resistance added to the half bridge (1). The ratio of the changes (before and after desensitization) in the outputs for half bridge (1) and half bridge (4) as a result of addition of the desensitizing resistance $R_D$ to half bridge (1) is set forth in Equations (6) and (7). In each instance, the desensitizing resistance $R_D$ has been added only to the half bridge (1).

$$\frac{\delta \text{ output } (1)}{\delta \text{ output } (4)} = \frac{-[\text{Output } (1) \text{ with } R_D] - [\text{Output } (1) \text{ without } R_D]}{+[\text{Output } (4) \text{ after } R_D] - [\text{Output } (4) \text{ before } R_D]} \quad \text{Equa. (6)}$$

$$\frac{\delta \text{ Output (first)}}{\delta \text{ Output (fourth)}} = -\frac{R(3R + R_D + \Delta)}{(R + \Delta)(R + R_D)} \quad \text{Equation (7)}$$

For the above example, with a no load strain gage resistance of R=350 Ω and Δ=0.35 Ω, the ratio of change in the outputs (before and after desensitizing half bridge (1)) of half bridge (1) to the change in the output of the half bridge (4) is approximately 3 as set forth in Equation (8).

$$\frac{\delta \text{ Output (first)}}{\delta \text{ Output (fourth)}} \cong -3 \quad \text{Equation (8)}$$

Equations (5) and (8) can be used to equalize the sensitivities of the half bridges of a half bridge pair. If, for example, the output of the first half bridge is greater than that of the fourth half bridge, a desensitizing resistor $R_D$ is added in series with both strain gages in the first half bridge. Equation (8) indicates that the output of the fourth half bridge will increase by one third of the amount by which the output of the first half bridge decreases. After desensitization of the two half bridges each will have an equal output as set forth in Equation (9)

$$\text{Output (1 and 4)} = \frac{[\text{Output (1)}] + 3[\text{Output (4)}]}{4} \quad \text{Equa. (9)}$$

The appropriate desensitization resistor $R_D$ to equalize the outputs and sensitivities of the first and fourth half bridges corresponding to locations 1 and 4 is then given by Equation (10).

$$R_D = 232 \left[ \frac{\text{Output (1) without } R_D}{\text{Outputs (1) and (4) with } R_D \text{ in (1)}} \right] - 1 \quad \text{Equation (10)}$$

The foregoing may be better understood by means of an example. Assume outputs before desensitization from half bridges (1) and (4) were:

Output (1)=10,300
Output (4)=9,900

Then from Equation (9) the outputs of half bridges (1) and (4), after desensitization will be:

$$\text{Output (1) and (4)} = \frac{10,300 + 3(9,900)}{4} = 10,000$$

Using this value in Equation (10) provides the value $R_D$ to be inserted into half bridge (1), required to equalize the outputs of half bridges (1) and (4).

$$R_D = 232 \left( \frac{10,300}{10,000} - 1 \right) = 6.96 \, r$$

Similar calculations are repeated for equalizing the sensitivities of half bridges (2) and (3).

After adding desensitizing resistors to half bridges (1) and (4) for equalizing the sensitivity of locations 1 and 4 and after adding desensitizing resistors to half bridges (2) and (3) for equalizing the sensitivity of the second and third locations, the chances are that the two pairs of half bridges will not have equal sensitivities. Further desensitization for equalization of the output from the two pairs of half bridges may thus be required. This may be accomplished by adding additional desensitization resistances in the form of resistors of equal value to the strain gages in the half bridges of the pair having a greater sensitivity and respectively greater outputs. Equal resistors are added in series with each of the four strain gages of the half bridge pair.

Reference is made to the transducer bridge circuit diagram according to the present invention shown in FIG. 4 for understanding the final step in desensitization and sensitivity equalization. The half bridges of FIG. 4 are electrically connected in the same manner as the half bridges of FIG. 3. The first and second transducer bridge circuits are connected in parallel as heretofore described. A desensitizing resistance $R_a$ has been added to equalize the sensitivity of half bridge (1) to that of half bridge (4), the value of resistance $R_a$ having been calculated in accordance with Equation (10). One resistor $R_a$ is added in series with each of the strain gages 1C and 1T in half bridge (1). A desensitizing resistance $R_b$ has been added in half bridge (3) for equalizing the sensitivity and output of half bridge (3) to that of half bridge (2). Thus, in this example, the sensitivity of half bridge (4) was found to be less than the sensitivity of half bridge (1) and the sensitivity of half bridge (2) was found to be less than the sensitivity of half bridge (3). After desensitization and equalization of the respective pairs, the sensitivity and output of half bridge (1) is equal to that of half bridge (4) and the sensitivity and output of half bridge (3) is equal to that of half bridge (2).

The pairs of half bridges themselves, however, are not necessarily equal in output and sensitivity to each other. Thus, assuming that the corrected and now equalized outputs of half bridge (1) and half bridge (4) are greater than the corrected and now equalized outputs of half bridge (2) and half bridge (3), a desensitizing resistance $R_c$ is then added to all the strain gages of the first pair of half bridges, namely half bridges (1) and (4), for equalizing the first pair with the second pair. With the desensitizing resistance $R_c$ added in series with each of the strain gages of the first pair as shown in FIG. 4 the effect on the output of the first half bridge is given by Equation (11).

$$\frac{\text{Output (1) without } R_c}{\text{Output (1) with } R_c} = \quad \text{Equation (11)}$$

$$\frac{R(R + R_a + R_c)(2R + R_a + 2R_c + \Delta)}{(R + R_c)(R_a + R)(2R + R_a + \Delta)}$$

By using the above example of R=350 Ω and Δ=0.35 Ω Equation (11) may be simplified for a satisfactory solution for the desensitizing resistor $R_c$ as set forth in Equation (12).

$$R_c \cong (350 + 1.5 R_a) \left[ \frac{\text{Output (1) without } R_c}{\text{Output (1) with } R_c} - 1 \right] \quad \text{Equation (12)}$$

In the foregoing example where the sensitivities and outputs of half bridges (1) and (4) are greater than the sensitivities and outputs for half bridges (2) and (3) the value of the desensitizing resistor $R_c$ is given respectively by either Equation (13) or Equation (14) as follows.

$$R_c = (350 + 1.5R_a)\left[\frac{\text{Output (1)}}{\text{Output (2)}} - 1\right] \quad \text{Equation (13)}$$

$$R_c = (350 + 1.5R_a)\left[\frac{\text{Output (4)}}{\text{Output (3)}} - 1\right] \quad \text{Equation (14)}$$

With reference to FIG. 4 the desensitizing resistances $R_a$ and $R_c$ connected in series with the strain gages of the first half bridge and in practice are combined into a single resistance.

According to one embodiment of the invention the procedure for achieving the foregoing equalization adjustment is as follows. The weight or load is applied successively to each corner or load sensitive transducer location of a gaged plate or other load measuring device to measure the output or sensitivity in each location. The various desensitization resistances are then calculated using Equations (1) to (14). In the preferred form of the invention, the output values are stored in a hand held calculator programmed with algorithms following the above Equations (1) to (14) for calculating and displaying the required desensitization resistances for each half bridge at each location. The calculations are performed for equalizing the sensitivity of the half bridges in each pair relative to each other and of the pairs forming a bridge circuit relative to each other.

According to one example, the desensitization resistances are connected in series with the strain gages in each half bridge in the form of short pieces of low temperature coefficient Constantan resistance wire which is so located that it does not participate in strain sensing. The lengths of Constantan wire are selected to correspond with the calculated desensitization resistances $R_a$, $R_b$, $R_c$ and the combination of $R_a + R_c$. The output of the platform scale is then remeasured by individually applying the load at each corner or other load sensitive transducer location. By this first stage of electrical equalization using lengths of resistant wire, the outputs of the respective locations may be equalized within a tolerance level of 0.1%. The tolerance level economically achievable by this electrical desensitization may be further improved by combining the electrical desensitizing with a mechanical equalization using the grinding or filing step described above. In this instance, only a small amount of mechanical adjustment is required to bring the variation of the measured output signal to within a tolerance level of 0.02%.

With refined instrumentation techniques associated with inserting the precise values of desensitization resistances it is possible to achieve 0.02% sensitivity equalization purely electrically and without recourse to subsequent mechanical adjustments.

Referring to FIG. 4, it is important to note that in all cases desensitizing resistances have been inserted in such a manner that the overall, paralleled bridge circuit has been maintained in balance. That is in half bridge (1) equal amounts of resistance $R_a$ and $R_c$ have been added in series with strain gages 1C and 1T and equal resistances $R_c$ and $R_b$ are added in series with strain gages in half bridges (4) and (3), respectively; each precaution maintaining bridge balance. In addition to maintaining bridge balance, temperature effects on bridge balance caused by asymmetrical resistive desensitizations are eliminated or greatly reduced. These are important features of the invention.

Although the invention has been described with reference to specific example embodiments it will be appreciated, that it is intended to cover all modifications and equivalents within the scope of the appended claims.

What is claimed is:

1. A method for desensitizing the load measuring sensitivities of a plurality of strain gages forming at least two full bridge circuits relative to each other to provide uniform load measuring sensitivities with due regard to a shunting interacting effect resulting when said strain gages are electrically interconnected for forming at least two pairs of half bridges which in turn are electrically interconnected to form said at least two full bridges, said strain gages being secured in pairs to at least four load measuring beams forming a load measuring device, comprising the following steps:

(a) successively applying a standardized load to each of said load measuring beams for determining the strain gage pairs having the lowest sensitivity and the strain gage pairs having higher sensitivities relative to said lowest sensitivity;

(b) determining, by calculation, a sensitivity change value representing said shunting interacting effect resulting from connecting at least two pairs of half bridges in parallel to each other to form said at least two paralleled full bridges, (c) calculating, by taking into account said higher sensitivities and said sensitivity change value, for each strain gage pair having a higher sensitivity than said lowest sensitivity, desensitizing resistances to be connected in series with the respective one of said strain gage pairs having a higher sensitivity for reducing the respective higher sensitivity and for neutralizing said shunting interacting effect, and (d) electrically connecting said calculated desensitizing resistances in series with the respective strain gage pairs for achieving said desensitizing of said strain gages and said neutralizing of said shunting interacting effect, simultaneously.

2. In a bridge circuit arrangement for measuring loads with the aid of sensing beams having strain gages attached to said load sensing beams, comprising at least four sensing beams each carrying a pair of strain gages for a total of eight strain gages forming eight bridge arms electrically connected to form at least two pairs of half bridges which in turn are electrically connected in parallel to each other to form at least full bridges, each half bridge comprising a tension sensing strain gage and a compression sensing strain gage forming a pair, the improvement comprising desensitizing resistors electrically connected in series directly with said strain gages in said bridge arms, said desensitizing resistors being calculated for reducing the load sensitivity of at least certain strain gages down to the lowest load sensitivity of one strain gage in a group, said desensitizing resistors being further calculated for neutralizing a shunting interacting effect which results due to the parallel connection of two half bridges forming a pair.

* * * * *